United States Patent
Fukuda et al.

(10) Patent No.: US 10,479,939 B2
(45) Date of Patent: Nov. 19, 2019

(54) SOIL EROSION PREVENTION AGENT

(71) Applicant: Denka Company Limited, Chuo-ku, Tokyo (JP)

(72) Inventors: Koichi Fukuda, Ichihara (JP); Hironori Konishi, Ichihara (JP); Kazuhiro Kote, Ichihara (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 188 days.

(21) Appl. No.: 15/118,395

(22) PCT Filed: Feb. 4, 2015

(86) PCT No.: PCT/JP2015/053136
§ 371 (c)(1),
(2) Date: Oct. 26, 2016

(87) PCT Pub. No.: WO2015/122333
PCT Pub. Date: Aug. 20, 2015

(65) Prior Publication Data
US 2017/0174988 A1    Jun. 22, 2017

(30) Foreign Application Priority Data
Feb. 12, 2014  (JP) ................ 2014-024559

(51) Int. Cl.
*C09K 17/20* (2006.01)
*C08F 218/08* (2006.01)
*C09K 17/16* (2006.01)

(52) U.S. Cl.
CPC ............ *C09K 17/20* (2013.01); *C08F 218/08* (2013.01); *C09K 17/16* (2013.01)

(58) Field of Classification Search
CPC ....... C08F 218/08; C09K 17/20; C09K 17/16; E02D 17/00
USPC ....................................................... 523/132
See application file for complete search history.

(56) References Cited

U.S. PATENT DOCUMENTS

| | | | | |
|---|---|---|---|---|
| 5,969,025 A | * | 10/1999 | Corzani | A61L 15/24 524/272 |
| 2013/0037621 A1 | * | 2/2013 | Wantling | C09K 3/22 239/1 |

FOREIGN PATENT DOCUMENTS

| | | | |
|---|---|---|---|
| JP | 53125305 A | * 11/1978 | ............. E02D 17/20 |
| JP | 03-119223 A | 5/1991 | |
| JP | 11-323331 A | 11/1999 | |
| JP | 2000-080365 A | 3/2000 | |
| JP | 2000-302808 A | 10/2000 | |

(Continued)

OTHER PUBLICATIONS

Toki Kensetsu KK, Derwent Abstract of JP 53-125305 A, Nov. 1978. (Year: 1978).*

(Continued)

*Primary Examiner* — David T Karst
(74) *Attorney, Agent, or Firm* — Christensen O'Connor Johnson Kindness PLLC

(57) ABSTRACT

Provided is a soil erosion prevention agent which can suppress the amount of resin used without decreasing soil erosion prevention effect. A soil erosion prevention agent containing a water-borne resin emulsion, wherein: the emulsion has a solid content of 30 to 70 mass %; and the emulsion has a viscosity of 50 mPa·s or lower measured at 30° C. when a water content of the emulsion is adjusted so that the solid content of the emulsion is 40 mass %, is provided.

2 Claims, 2 Drawing Sheets

(56) References Cited

FOREIGN PATENT DOCUMENTS

| JP | 2006-290689 A | 10/2006 |
|----|---------------|---------|
| JP | 4048800 B     | 12/2007 |
| JP | 2008-120892 A | 5/2008  |
| JP | 2009-249531 A | 10/2009 |
| JP | 2013-049740 A | 3/2013  |
| JP | 2013-249414 A | 12/2013 |

OTHER PUBLICATIONS

International Search Report dated Apr. 21, 2015, issued in corresponding International Application No. PCT/JP2015/053136, filed Feb. 4, 2015, 2 pages.

Notification of Reasons for Refusal dated Jan. 30, 2019, issued in corresponding Japanese Application No. 2015-562791, filed Aug. 12, 2016, 6 pages.

* cited by examiner

SOIL EROSION PREVENTION AGENT

TECHNICAL FIELD

The present invention relates to a soil erosion prevention agent suitably used to prevent soil erosion from a slope surface and the like formed by filled soil and cut soil seen in construction of developed land, road, dam and the like.

BACKGROUND

At the construction site of developed land, road, dam and the like, soil cutting and soil filling are performed to form a slope surface. When such slope surface is left as it is, the slope surface gets eroded by rain and weathering, thereby causing accidents such as landslide and rock fall. Accordingly, in order to prevent erosion of soil, Patent Literature 1 discloses formulating drying inhibitor for soil comprising water-swelling and water-absorbing resin, surfactant, and synthetic resin emulsion into a spraying material by a ratio of 0.5 to 1.5 kg per 1 $m^3$ of the spraying material, and spraying such spraying material onto the slope surface.

CITATION LIST

Patent Literature

[Patent Literature 1] Patent No. JP4048800

SUMMARY OF INVENTION

Technical Problem

In Patent Literature 1, drying inhibitor for soil is formulated by a ratio of 0.5 to 1.5 kg per 1 $m^3$ of the spraying material, however, no study is made in terms of decreasing the amount of resin used in the drying inhibitor for soil while achieving sufficient soil erosion prevention effect.

The present invention has been made by taking the afore-mentioned circumstances into consideration. The present invention provides a soil erosion prevention agent which can decrease the amount of resin used while maintaining the soil erosion prevention effect.

Solution to Problem

According to the present invention, provided is a soil erosion prevention agent comprising: a water-borne resin emulsion, wherein: the emulsion has a solid content of 30 to 70 mass %; and the emulsion has a viscosity of 50 mPa·s or lower measured at 30° C. when a water content of the emulsion is adjusted so that the solid content of the emulsion is 40 mass %.

Advantageous Effects of Invention

Through the experiments conducted by the present inventors, it became apparent that when the amount of polymer in the soil erosion prevention agent contained in 1 $m^3$ of vegetation base comprising bark compost, fertilizer, seeds, soil erosion prevention agent and the like is large, the soil erosion prevention effect is high. Further, it became apparent that even when the same amount of polymer is added, the erosion prevention effect differs depending on the soil erosion prevention agent. In particular, it became apparent that the synthetic resin emulsion having a viscosity of 50 mPa·s measured at 30° C. when the water content of the synthetic resin emulsion is adjusted so that the solid content is 40 mass % can exhibit superior effect as the soil erosion prevention agent, thereby leading to completion of the invention.

Hereinafter, various embodiments of the present invention will be exemplified. The embodiments provided hereinafter can be combined with each other.

Preferably, the emulsion is an emulsion of a resin containing a structure unit derived from vinyl acetate.

Preferably, the emulsion is an ethylene-vinyl acetate copolymer emulsion.

Preferably, the solid content is 35 to 55 mass %.

Preferably, the emulsion has a viscosity of 1000 mPa·s or lower measured at 30° C.

DESCRIPTION OF EMBODIMENTS

Figure 1:
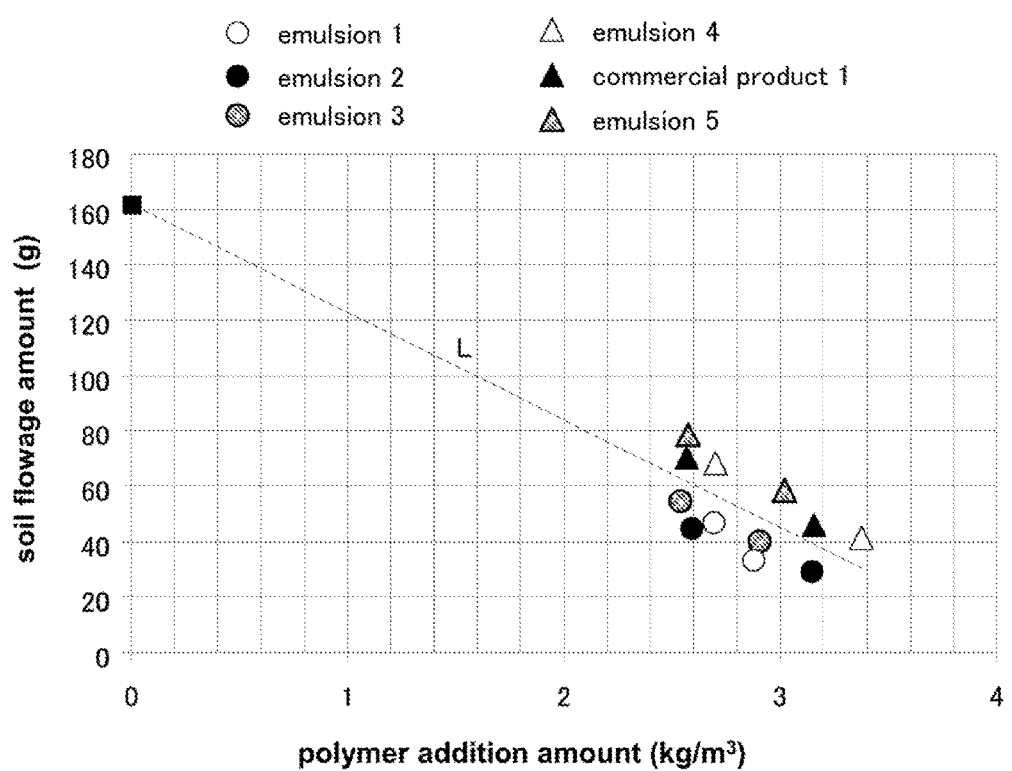
FIG. 1 is a graph obtained by plotting the relation between the polymer addition amount and the soil flowage amount as in Table 2.

Hereinafter, the embodiments of the present invention will be explained in detail.

The soil erosion prevention agent of the present invention contains a water-borne resin emulsion, the emulsion having a solid content of 30 to 70 mass %, and the viscosity measured at 30° C. when the water content is adjusted so that the solid content of the emulsion is 40 mass % is 50 mPa·s.

There is no particular limitation regarding the type of the water-borne resin emulsion. Preferable examples of the emulsions are vinyl acetate resin emulsion, vinyl acetate copolymer emulsion, acrylic ester resin emulsion, styrene acrylic ester copolymer emulsion, ethylene-vinyl acetate copolymer emulsion, styrene-butadiene copolymer emulsion, vinylidene resin emulsion, polybutene resin emulsion, acrylonitrile-butadiene resin emulsion, methacrylate-butadiene resin emulsion, asphalt emulsion, epoxy resin emulsion, urethane resin emulsion, silicone resin emulsion and the like. Among these, emulsions containing structural unit derived from vinyl acetate (vinyl acetate resin emulsion, vinyl acetate copolymer emulsion, ethylene-vinyl acetate copolymer emulsion and the like) are preferable, and ethylene-vinyl acetate copolymer emulsion is further preferable.

There is no particular limitation regarding the manufacturing method of the water-borne resin emulsion. For example, the emulsion can be manufactured by adding an emulsifier and monomer into a dispersion medium, the dispersion medium containing water as a main component, and then allowing the monomer to undergo emulsion polymerization with agitation. The viscosity of the emulsion obtained can be adjusted by the type and amount of emulsifier used in the manufacturing process. As the emulsifier, ionic (cationic, anionic, zwitterionic) surfactant and non-ionic (nonionic) surfactant can be mentioned for example. As the non-ionic surfactant, low molecular surfactant such as alkyl glycoside, or high molecular surfactant such as polyethylene glycol and polyvinyl alcohol can be mentioned for example, and high molecular surfactant is preferable. Regarding the high molecular surfactant, the ones comprising polyvinyl alcohol are especially preferable, and the average polymerization degree is 200 to 2500 for example, preferably 400 to 2200, and more preferably 500 to 2000. The performance of polyvinyl alcohol as the emulsifier and dispersant becomes high when the average polymerization degree is high. Accordnigly, polyvinyl alcohol having an average polymerization degree suitable to obtain the emulsion with desired degree of dispersion should be used. In addition, regarding the polyvinyl alcohol, a plurality of polyvinyl alcohols having a different average polymerization degree can be used in combination. The degree of saponification of the polyvinyl alcohol is not particularly limited, and is 70% or higher for example, preferably 80 to 95%. When the degree of saponification is too low, solubility with water becomes extremely low, and thus industrial utilization becomes difficult since a special dissolving process would be required. When the degree of saponification is low, the performance of polyvinyl alcohol as the emulsifier and dispersant becomes high. Accordingly, polyvinyl alcohol having a degree of saponification suitable to obtain the emulsion with desired degree of dispersion should be used. In addition, regarding the polyvinyl alcohol, a plurality of polyvinyl alcohols having a different degree of saponification can be used in combination. The amount of emulsifier added is not particularly limited, and is 0.5 to 20 parts by mass with respect to 100 parts by mass of dispersant for example, and 1 to 10 parts by mass with respect to 100 parts by mass of dispersant is preferable. When the amount of emulsifier added is large, the performance of the emulsifier as the emulsifier and dispersant becomes high. Accordingly, the amount of emulsifier added is suitably adjusted so that an emulsion with desired degree of dispersion is obtained.

The solid content of the water-borne resin emulsion is 30 to 70 mass %, preferably 35 to 55 mass %. When the solid content is too low, the amount of polymer contained in the emulsion is too small. Accordingly, the soil erosion prevention effect becomes low. On the other hand, when the solid content is too high, the viscosity becomes too high, and it becomes difficult to formulate the emulsion into the spraying material.

Here, the water-borne resin emulsion of the present invention has a viscosity (hereinafter referred to as adjusted viscosity) of 50 mPa·s measured at 30° C. when the water content is adjusted so that the solid content of the water-borne resin emulsion is 40 mass %. From the experiments performed by the present inventors, it became apparent that even when the composition and solid content of the water-borne resin emulsion are the same, viscosity of the water-borne resin emulsion would vary when the dispersion state changes. In addition, when the solid content is made the same, the ones having lower viscosity showed superior performance as the soil erosion prevention agent. Adjustment of the solid content can be conducted in the following manner. In a case of a water-borne resin emulsion having a solid content exceeding 40 mass %, pure water is added while gently agitating the water-borne resin emulsion until the solid content reaches 40 mass %. On the other hand, in a case of a water-borne resin emulsion having a solid content lower than 40 mass %, the solid content of the water-borne resin emulsion can be adjusted by concentration performed by maintaining the emulsion temperature at 50° C. and blowing nitrogen while mildly agitating the water-borne resin emulsion. Then, viscosity of the water-borne resin emulsion is measured when the temperature of the water-borne resin emulsion is 30° C. The solid content can be measured in accordance with JIS K 6828. The drying condition is 3 hours at 105° C. On the other hand, viscosity can be measured under the conditions of 30° C. at 30 rpm using a Brookfield viscometer.

The lower the adjusted viscosity is, the higher the workability during formulation with the spraying material. Accordingly, the adjusted viscosity is preferably low. Therefore, there is no specific lower limit of the adjusted viscosity, and is 10 mPa·s for example.

The viscosity of the water-borne resin emulsion becomes high as the solid content of the water-borne resin emulsion becomes high. When the solid content of the water-borne resin emulsion exceeds 40 mass %, the viscosity can exceed 50 mPa·s. However, when the viscosity is too high, it becomes difficult to formulate the water-borne resin emulsion into the spraying material. Accordingly, the viscosity measured at 30° C. is preferably 1000 mPa·s or lower, more preferably 500 mPa·s or lower.

Next, the method for utilizing the soil erosion prevention agent of the present invention will be explained. The soil erosion prevention agent can be sprayed onto the plane to be protected alone, or can be sprayed together with a spraying material which is a mixture including soil as a main component, seed, fertilizer and the like, by mixing the soil erosion prevention agent into the spraying material. There is no particular limitation regarding the construction method for spraying the spraying material onto the plane to be sprayed. For example, hydroseeding method, soil blasting method, base blasting method and the like can be mentioned. Otherwise, when the plane to be sprayed is large, seeding by spraying using aircrafts such as helicopters can be performed.

There is no particular limitation regarding the spraying material used. For example, organic material such as bark compost, sphagnum peat and the like or sandy soil is blended with seed, fertilizer and the like, and is used as the spraying material There is no particular limitation regarding the addition amount of the soil erosion prevention agent. Here, it is preferable that the soil erosion prevention agent is added so that the added polymer amount contained in the water-borne resin emulsion is 0.5 to 5 kg (preferably 2 to 4 kg) with respect to 1 $m^3$ of the spraying material.

EXAMPLES

Hereinafter, Examples of the present invention will be described. Unless otherwise noted, "parts" and "%" means "parts by mass" and "mass %, respectively.

Manufacturing Example 1

Emulsion 1

To a high pressure polymerization tank equipped with an agitator, a solution prepared by dissolving 4.1 parts of DENKA POVAL B-05 (saponification degree of 88 mol %, average polymerization degree of 600, available from DENKA Company Limited) and 1.5 parts of DENKA POVAL B-17 (saponification degree of 88 mol %, average polymerization degree of 1700, available from DENKA Company Limited) as an emulsifier, and 0.1 parts of formamidinesulfinic acid, 0.2 parts of sodium acetate, 0.005 parts of ferrous sulfate heptahydrate, and 0.01 parts of tetrasodium ethylenediaminetetraacetate as auxiliaries was introduced. Subsequently, vinyl acetate monomer and ethylene were added under agitation. After raising the internal solution temperature to 55° C., aqueous ammonium persulfate solution was added continuously and polymerization was performed. Here, vinyl acetate monomer and ethylene were added by 109 parts and 20 parts, respectively. At the last stage of the polymerization, aqueous t-butyl hydroperoxide solution was added, and the polymerization was maintained until the unreacted vinyl acetate monomer reached less than 2%.

After the polymerization, the remaining ethylene was purged, and the unreacted vinyl acetate monomer contained in the emulsion obtained was removed under reduced pressure. Accordingly, a water-borne resin emulsion containing unreacted vinyl acetate monomer by 0.5% or less was obtained.

The solid content of the emulsion obtained was measured in accordance with JIS K 6828. The drying conditions were 3 hours at 105° C. The results of the measurement are shown in Table 1.

Manufacturing Examples 2 to 5

Emulsions 2 to 5

Emulsions 2 to 5 were manufactured with the same conditions as the Manufacturing Example 1, except that emulsifiers shown in Table 1 were used by the formulation amount (parts by mass) as shown in Table 1, and vinyl acetate monomer and ethylene were used by the formulation amount (parts by mass) as shown in Table 1. Solid content was measured for the emulsions obtained in the same manner as Manufacturing Example 1. The results are shown in Table 1.

[Table 1]

[Preparation of Samples]

Emulsions 1 to 5 obtained in Manufacturing Examples 1 to 5 and commercially available vinyl acetate-based emulsion (commercial product 1) were diluted to prepare Samples 2 to 29. Solid content and viscosity of the Samples were measured. Dilution of the emulsion was conducted in a following manner. First, emulsion was taken in a container, and defined amount of pure water was added gradually with gentle agitation. The solid content was measured in the same manner as afore-mentioned. Viscosity was measured under the conditions of 30° C. at 30 rpm using a Brookfield viscometer (available from TOKI SANGYO CO., LTD, catalog No. TVB-33L). The results are shown in Table 2.

[Evaluation of Soil Erosion Prevention Effect]

Next, a vegetation base made by a thick layer base material spraying method formulated with the prepared sample was constructed, and the amount of soil that flow by the rainfall test was measured.

(1) Blending: Into a container, 7L of bark compost (available from Fujimi-ryokka co. jp, Fujimi-soil No. 5), 21 g of high analysis compound fertilizer (available from Nittofc Co., Ltd., 15-15-15), 3.5 g of seeds (available from KANEKO SEEDS CO.,LTD., Italian ryegrass), and 21 g of the erosion prevention agent were added, and the mixture was kneaded to prepare a vegetation base material.

(2) Construction: The vegetation base material was filled into a wooden frame and was smoothed. Then, the vegetation base material was pressured to half the volume from the upper side.

(3) Maturing: The wooden frame was removed, and the vegetation base material was allowed to mature overnight in a room kept at 23° C.

(4) Rainfall: Water was applied to the matured vegetation base using a watering can. The vegetation base was inclined by 9°, and water was applied from a height of 50 cm with an intensity of 200 mm per 1 hour for 30 minutes. The dried weight of the soil flown was measured. Here, the drying conditions of the soil was air drying overnight followed by drying at 105° C. for 3 hours.

The results obtained are shown in Table 2 below. The amount of the sample added was fixed to 6 kg/m$^3$, and the addition amount and the solid content were multiplied to calculate the polymer addition amount.

TABLE 1

| | | average polymerization degree | emulsion | | | | |
|---|---|---|---|---|---|---|---|
| | | | 1 | 2 | 3 | 4 | 5 |
| emulsifier | DENKA POVAL B-05 | 600 | 4.1 | 3.6 | 4.1 | 1.0 | — |
| | DENKA POVAL B-17 | 1700 | 1.5 | 0.7 | 1.6 | 4.1 | 6.5 |
| | Polyoxyethylenealkyl ether based surfactant | — | — | — | — | 0.8 | — |
| | vinyl acetate monomer | | 109 | 94 | 111 | 107 | 109 |
| | ethylene | | 20 | 40 | 21 | 23 | 20 |
| | solid content (mass %) | | 54.1 | 56.1 | 55.4 | 56.3 | 56.1 |

TABLE 2

| sample | type | rotor No. | solid content (mass %) | viscosity (mPa·s) | addition amount (kg/m³) | polymer addition amount (kg/m³) | soil flowage amount (g) |
|---|---|---|---|---|---|---|---|
| 1 | water | 1 | 0 | 1 | 6.0 | 0 | 164.1 |
| 2 | emulsion 1 | 3 | 54.1 | 2446 | — | — | — |
| 3 | | 2 | 49.9 | 405 | — | — | — |
| 4 | | 2 | 47.9 | 199 | 6.0 | 2.88 | 33.2 |
| 5 | | 2 | 44.9 | 91 | 6.0 | 2.69 | 46.4 |
| 6 | | 2 | 43.8 | 66 | — | — | — |
| 7 | | 2 | 40.0 | 28 | — | — | — |
| 8 | | 2 | 38.1 | 20 | — | — | — |
| 9 | emulsion 2 | 3 | 56.1 | 1220 | — | — | — |
| 10 | | 2 | 52.5 | 256 | 6.0 | 3.15 | 28.9 |
| 11 | | 2 | 51.0 | 176 | — | — | — |
| 12 | | 2 | 40.0 | 12 | — | — | — |
| 13 | | 2 | 43.2 | 38 | 6.0 | 2.59 | 44.6 |
| 14 | emulsion 3 | 4 | 55.4 | 4100 | — | — | — |
| 15 | | 2 | 48.5 | 520 | 6.0 | 2.91 | 40.0 |
| 16 | | 2 | 42.4 | 95 | 6.1 | 2.54 | 54.1 |
| 17 | | 2 | 40.0 | 45 | — | — | — |
| 18 | emulsion 4 | 4 | 58.3 | 10600 | 6.0 | 3.38 | 41.3 |
| 19 | | 2 | 45.0 | 239 | 6.0 | 2.70 | 68.1 |
| 20 | | 2 | 42.1 | 149 | — | — | — |
| 21 | | 2 | 40.0 | 71 | — | — | — |
| 22 | commercial product 1 | 4 | 52.6 | 5700 | 6.0 | 3.16 | 46.1 |
| 23 | | 2 | 45.2 | 700 | — | — | — |
| 24 | | 2 | 42.8 | 320 | 6.0 | 2.57 | 70.4 |
| 25 | | 2 | 40.0 | 140 | — | — | — |
| 26 | emulsion 5 | 4 | 56.1 | 132000 | — | — | — |
| 27 | | 4 | 50.3 | 31240 | 6.0 | 3.02 | 58.4 |
| 28 | | 4 | 42.9 | 7150 | 6.0 | 2.57 | 78.5 |
| 29 | | 4 | 40.0 | 3510 | — | — | — |

FIG. 1 is a graph obtained by plotting the relation between the polymer addition amount and the soil flowage amount as in Table 2. Referring to FIG. 1, it can be understood that when the polymer addition amount increases, the soil flowage amount decreases following roughly the linear line L shown in FIG. 1. In the graph of FIG. 1, the points of emulsions 1 to 3 are all positioned below the liner line L, and the points of emulsions 4 to 5 and commercial product 1 are all positioned above the linear line L. This result means that when the polymer addition amount is the same, emulsions 1 to 3 are more effective than emulsions 4 to and commercial product 1 in terms of suppressing the soil flowage.

Figure 2:
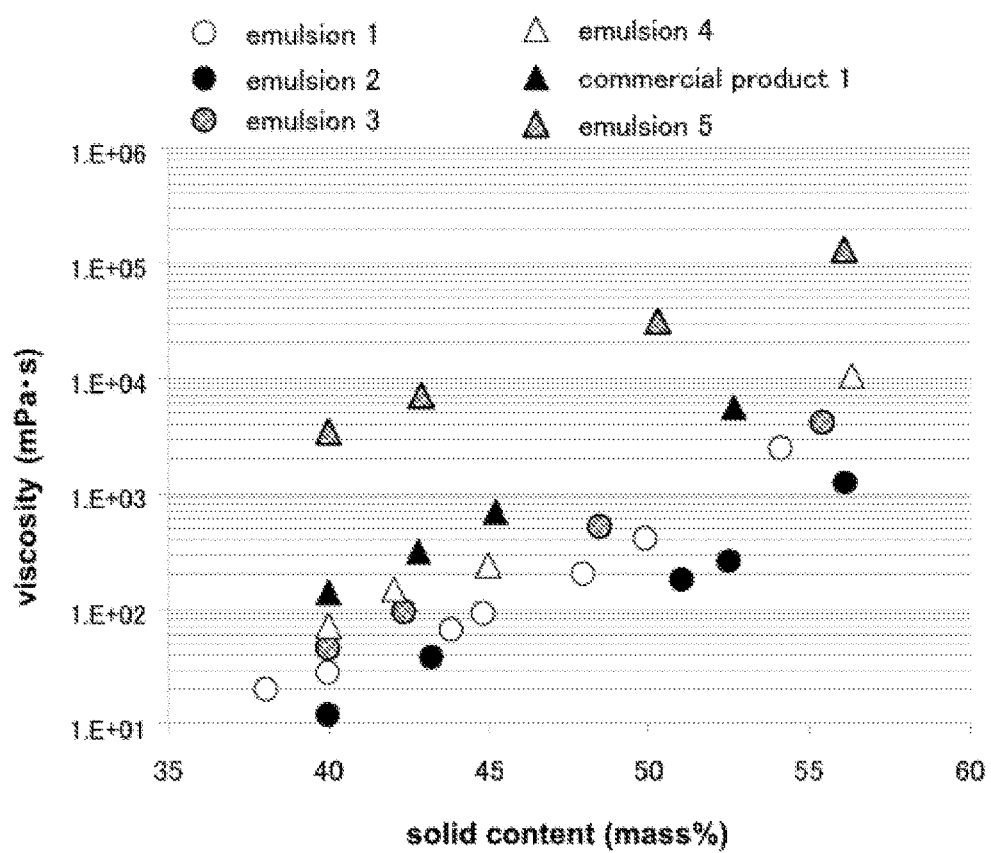
FIG. 2 is a graph obtained by plotting the relation between the solid content and the viscosity as in Table 2.

In addition, FIG. 2 is a graph obtained by plotting the relation between the solid content and the viscosity as in Table 2. Referring to FIG. 2, it can be understood that the solid content and the common logarithm of the viscosity have an approximately linear relation, and that the slopes shown in the graph for the emulsions to 5 and the commercial product 1 have approximately the same inclination. In addition, it can be understood that the viscosity of the emulsions 1 to 3 have a lower value than the emulsions 4 to and the commercial product 1, regardless of the value of the solid content. Here, referring to Table 2 and FIG. 2, it is apparent that when the solid content is 40 mass %, the viscosity of the emulsions 1 to 3 are 50 mPa·s or lower, and the viscosity of the emulsions 4 to 5 and the commercial product are over 50 mPa·s.

Accordingly, it has been demonstrated that water-borne resin emulsion having a viscosity of 50 mPa·s or lower when the solid content is 40 mass % is superior as the soil erosion prevention agent, and that by using such water-borne resin emulsion as the soil erosion prevention agent, the amount of the resin used can be suppressed without decreasing the soil erosion prevention effect.

The invention claimed is:

1. A soil erosion prevention composition comprising a spraying material and a soil erosion prevention agent, wherein:
    the spraying material comprises soil; and
    the soil erosion prevention agent comprises:
    a water-borne resin emulsion, wherein:
        the emulsion is an ethylene-vinyl acetate copolymer emulsion;
        the emulsion has a solid content of 35 to 55 mass %; and
        the emulsion has a viscosity of 50 mPa·s or lower measured at 30° C. when a water content of the emulsion is adjusted so that the solid content of the emulsion is 40 mass %.

2. The soil erosion prevention composition of claim 1, wherein the emulsion has a viscosity of 1000 mPa·s or lower measured at 30° C.

* * * * *